April 26, 1932.   F. R. EMERY   1,855,477
WEED PULLER
Filed March 24, 1930

INVENTOR
F. R. Emery
BY
ATTORNEY

Patented Apr. 26, 1932

1,855,477

UNITED STATES PATENT OFFICE

FRED R. EMERY, OF SAN FRANCISCO, CALIFORNIA

WEED PULLER

Application filed March 24, 1930. Serial No. 438,264.

This invention relates to weed pulling implements of a type especially intended for pulling relatively isolated weeds in lawns, gardens, etc.

The principal object of my invention is to provide a device for the purpose by means of which the weeds may be effectively and easily engaged and pulled without the operator having to stoop over, and without his having to actually grasp the weeds with his hands and thus soil them by contact with the weeds or ground.

Though I particularly have this device in mind for weed pulling it will be evident from the following description and specification that the implement can also be effectively used for thinning beets, lettuce and similar plants.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawings similar characters of reference indicate corresponding parts in the several views.

Figure 1:
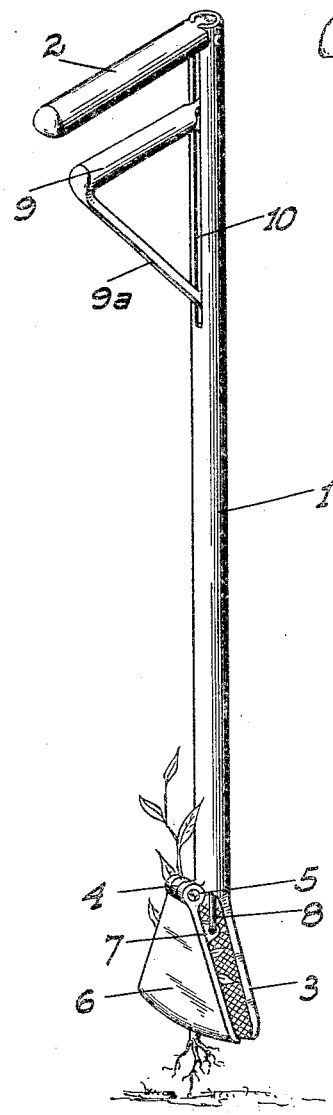
Fig. 1 is a perspective view of my implement as in operation.
Figure 2:
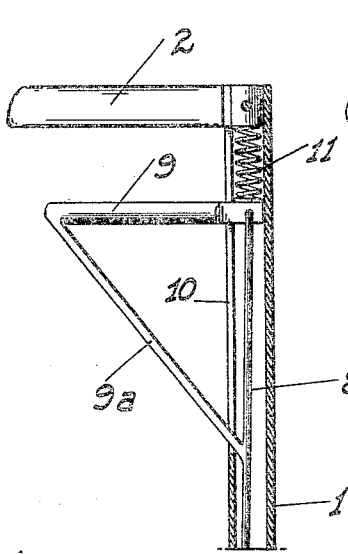
Fig. 2 is a foreshortened elevation of the same showing the jaws in their normally spread position.
Figure 2:
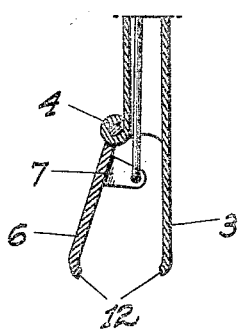
Figure 3:
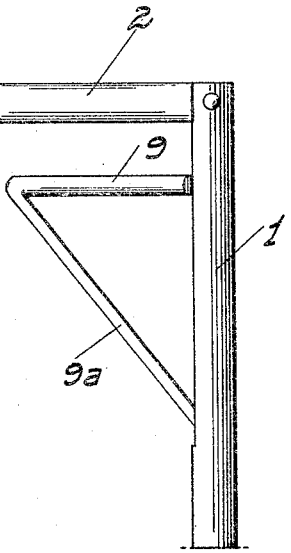
Fig. 3 is a side elevation of the puller showing the jaws as engaged with each other.
Figure 3:
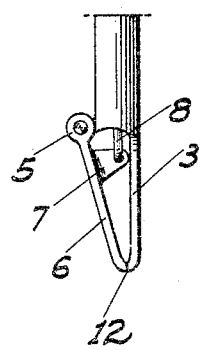

Referring now more particularly to the characters of reference on the drawings, the numeral 1 denotes a rigid tubular shank from the top of which a rigid handle 2 projects radially. On the side of the shank 1 opposite the handle and at the bottom of said shank the latter is formed with a depending jaw 3 which is flat and rigid with the shank. This jaw is substantially of triangular shape with its greatest width at the bottom. On the side opposite said jaw the shank is formed at the bottom with a hinge eye 4 which cooperates with similar eyes 5 formed on the upper end of a movable jaw 6 disposed in cooperating and symmetrical relation to the fixed jaw.

On its inner face toward the top the jaw 6 has a lug 7 to which the lower end of a rod 8 is flexibly secured. This rod extends upwardly inside the shank 1 to adjacent the top of the same, at which end it is connected to an operating grip 9. This grip is disposed parallel to and under the handle 2, and projects through and is movable along a slot 10 cut down the side of the shank. Said grip and the handle are spaced apart only a sufficient distance to enable the same to be both engaged by one hand of the operator. A diagonal brace 9a between the grip and the rod 8 holds the two in relative rigid relationship. A compression spring 11 between the grip and the handle inside the shank tends to press the grip and rod 8 down and maintain the jaws in separated relationship. The length of the shank is such that the operator may stand in a natural upright position and can manipulate the shank so that the jaws will straddle the weed or other plant to be pulled. When the jaws are thus properly disposed relative to the plant, and of course as close to the ground as possible so as to engage the root at the crown of the plant, the operator pulls up on the grip. This will cause the jaws to squeeze the plant, whereupon an upward pull on the tool as a whole will then cause the withdrawal of the weed from the ground as indicated in Fig. 1.

In order that the operator will not have to hold the tool in a perfectly vertical position the bottom edges of the jaws are curved somewhat from end to end, while they may also if desired be turned inwardly somewhat along their bottom edges as shown at 12 so as to provide a more positive grip with the plant without actually cutting through the same.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A weed puller comprising a rigid tubular shank having a longitudinal slot therein toward its upper end, a handle projecting at right angles to the upper end of the shank, a fixed jaw projecting from the lower end of the shank, a hinged jaw on the opposite side of the shank adapted to be moved into engagement with the first jaw, an inwardly projecting lug on the inner face of the hinged jaw, a rod connected to the lug and projecting into the shank, a handle parallel to the first handle and movable in the slot and to which the other end of the rod is connected, a diagonal brace connected from a midpoint on the rod to the outer end of the movable handle and adapted to engage the bottom of the slot to limit the downward movement of the handle and rod, and a yieldable pressure member normally maintaining the movable handle in its lowermost position.

In testimony whereof I affix my signature.

FRED R. EMERY.